(12) United States Patent
Yoon et al.

(10) Patent No.: US 12,421,358 B2
(45) Date of Patent: *Sep. 23, 2025

(54) POLYMER FILM, PREPARATION METHOD THEREOF, AND POLYMER FILM LAMINATE COMPRISING THE SAME

(71) Applicant: LG Chem, Ltd., Seoul (KR)

(72) Inventors: Kiyoul Yoon, Daejeon (KR); Seongkyun Kang, Daejeon (KR); Yu Jin Kim, Daejeon (KR); Gicheul Kim, Daejeon (KR); Hyeon Choi, Daejeon (KR); Se Yeol Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 244 days.

This patent is subject to a terminal disclaimer.

(21) Appl. No.: 17/802,796

(22) PCT Filed: Sep. 7, 2021

(86) PCT No.: PCT/KR2021/095082
§ 371 (c)(1),
(2) Date: Aug. 26, 2022

(87) PCT Pub. No.: WO2022/055338
PCT Pub. Date: Mar. 17, 2022

(65) Prior Publication Data
US 2023/0089009 A1    Mar. 23, 2023

(30) Foreign Application Priority Data

Sep. 8, 2020  (KR) .................. 10-2020-0114813
Sep. 8, 2020  (KR) .................. 10-2020-0114814
Sep. 6, 2021  (KR) .................. 10-2021-0118477

(51) Int. Cl.
*C08J 5/18*     (2006.01)
*B32B 3/24*     (2006.01)
(Continued)

(52) U.S. Cl.
CPC .............. *C08J 5/18* (2013.01); *B32B 3/266* (2013.01); *B32B 5/022* (2013.01); *B32B 27/12* (2013.01);
(Continued)

(58) Field of Classification Search
None
See application file for complete search history.

(56) References Cited

U.S. PATENT DOCUMENTS 4,061,846 A * 12/1977 Gross .................. C08L 35/00
                                             526/318.4
4,093,776 A *  6/1978 Aoki .................. C08F 120/06
                                             526/240
(Continued)

FOREIGN PATENT DOCUMENTS

CN    101081881 A  * 12/2007
CN    101962463 A  *  2/2011
(Continued)

OTHER PUBLICATIONS

Machine Translation of JP-2017222826-A, Dec. 2017 (Year: 2017).*
(Continued)

*Primary Examiner* — Jeffrey A Vonch
(74) *Attorney, Agent, or Firm* — Lerner David LLP (57) ABSTRACT

The present disclosure relates to a polymer film, a preparation method of the same, and a polymer film laminate. Specifically, it relates to a new type of polymer film, which is thin and exhibits excellent absorption performance while having excellent flexibility and mechanical properties. In addition, the polymer film is free from scattering or leaking, and does not require an auxiliary substance such as pulp, so that products can be made thinner and the manufacturing process and costs may be reduced. In addition, the present disclosure also relates to a preparation method of the above-
(Continued)

described polymer film, and a polymer film laminate including the new type of polymer film.

20 Claims, 4 Drawing Sheets

(51) Int. Cl.
    *B32B 3/26*     (2006.01)
    *B32B 5/02*     (2006.01)
    *B32B 27/12*     (2006.01)
    *B32B 27/30*     (2006.01)
    *C08F 220/06*     (2006.01)
    *C08K 5/053*     (2006.01)
    *C08L 33/02*     (2006.01)

(52) U.S. Cl.
    CPC .......... *B32B 27/308* (2013.01); *C08F 220/06* (2013.01); *C08K 5/053* (2013.01); *C08L 33/02* (2013.01); *B32B 2250/40* (2013.01); *B32B 2262/062* (2013.01); *B32B 2307/718* (2013.01); *B32B 2307/726* (2013.01); *B32B 2307/732* (2013.01); *B32B 2439/70* (2013.01); *B32B 2439/80* (2013.01); *B32B 2607/02* (2013.01); *C08J 2333/02* (2013.01); *C08J 2401/28* (2013.01); *C08L 2203/16* (2013.01); *C08L 2312/00* (2013.01); *Y10T 428/24273* (2015.01); *Y10T 428/24322* (2015.01); *Y10T 428/24331* (2015.01); *Y10T 442/676* (2015.04)

(56) References Cited

U.S. PATENT DOCUMENTS

| | | | | |
|---|---|---|---|---|
| 4,486,489 A * | 12/1984 | George | ............... | A61L 15/60 522/182 |
| RE31,822 E | 2/1985 | Erickson | ............... | A61L 15/60 442/288 |
| 4,541,426 A * | 9/1985 | Webster | ............... | A61L 15/26 602/42 |
| 4,666,983 A * | 5/1987 | Tsubakimoto | ............... | B01J 20/26 525/329.9 |
| 4,734,478 A * | 3/1988 | Tsubakimoto | ............... | A61L 15/18 527/311 |
| 4,746,514 A * | 5/1988 | Warne | ............... | C08F 2/46 522/69 |
| 5,076,265 A * | 12/1991 | Wokalek | ............... | A61L 26/0052 424/443 |
| 5,135,755 A * | 8/1992 | Czech | ............... | A61L 26/008 523/105 |
| 5,210,298 A * | 5/1993 | Shimomura | ............... | C07C 51/50 562/598 |
| 5,466,731 A * | 11/1995 | Akers | ............... | D01F 6/36 524/35 |
| 6,001,911 A * | 12/1999 | Ishizaki | ............... | A61F 13/531 524/556 |
| 6,051,317 A * | 4/2000 | Brueggemann | ............... | A61L 15/60 442/61 |
| 6,400,401 B1 | 6/2002 | Morino et al. | | |
| 9,346,938 B1 * | 5/2016 | Al-Harthi | ............... | A61L 15/60 |
| 2003/0054024 A1 * | 3/2003 | Munro | ............... | A61L 15/425 424/443 |
| 2003/0134102 A1 * | 7/2003 | Wang | ............... | A61L 15/60 428/315.7 |
| 2004/0068093 A1 * | 4/2004 | Merrigan | ............... | A61L 15/58 528/490 |
| 2004/0116287 A1 | 6/2004 | Wang et al. | | |
| 2005/0054788 A1 * | 3/2005 | Dairoku | ............... | C08F 20/06 526/317.1 |
| 2005/0137085 A1 * | 6/2005 | Zhang | ............... | A61F 13/531 502/402 |
| 2005/0153123 A1 * | 7/2005 | Herfert | ............... | A61F 13/534 526/341 |
| 2005/0176834 A1 | 8/2005 | Hintz et al. | | |
| 2005/0209411 A1 * | 9/2005 | Nestler | ............... | C08F 20/06 525/329.7 |
| 2006/0165801 A1 * | 7/2006 | Ishii | ............... | A61K 31/375 424/487 |
| 2007/0088106 A1 * | 4/2007 | Schlesiger | ............... | C08L 1/26 524/42 |
| 2007/0219521 A1 * | 9/2007 | Hird | ............... | A61L 15/28 604/372 |
| 2010/0166375 A1 * | 7/2010 | Parris | ............... | G02B 6/44384 385/113 |
| 2010/0324464 A1 * | 12/2010 | Kamakura | ............... | A61L 15/60 602/43 |
| 2011/0301027 A1 * | 12/2011 | Bitis | ............... | A61L 15/60 502/404 |
| 2013/0129993 A1 | 5/2013 | Qin et al. | | |
| 2013/0261208 A1 * | 10/2013 | Borges De Couraca | ............... | A61L 27/48 264/496 |
| 2013/0289157 A1 * | 10/2013 | Sato | ............... | A61K 47/10 523/105 |
| 2014/0127510 A1 | 5/2014 | Handa et al. | | |
| 2017/0072088 A1 * | 3/2017 | Miinea | ............... | A61L 15/24 |
| 2018/0153746 A1 | 6/2018 | Sookraj | | |
| 2018/0163004 A1 * | 6/2018 | Nishiumi | ............... | C08J 3/075 |
| 2018/0185820 A1 * | 7/2018 | Tada | ............... | B01J 20/3085 |
| 2019/0105633 A1 * | 4/2019 | Tamaki | ............... | A61L 15/60 |
| 2020/0023625 A1 * | 1/2020 | Torii | ............... | A61L 15/24 |
| 2020/0276062 A1 | 9/2020 | Tagomori | | |
| 2021/0163694 A1 * | 6/2021 | Akuta | ............... | C08J 3/075 |
| 2022/0362743 A1 | 11/2022 | Yoon et al. | | |
| 2023/0067846 A1 * | 3/2023 | Yoon | ............... | B29C 41/46 |
| 2023/0071674 A1 * | 3/2023 | Yoon | ............... | C08F 2/44 |
| 2023/0107670 A1 * | 4/2023 | Yoon | ............... | C08F 120/06 524/44 |
| 2024/0082819 A1 | 3/2024 | Yoon et al. | | |

FOREIGN PATENT DOCUMENTS

| | | | | |
|---|---|---|---|---|
| CN | 103113700 A | * | 5/2013 | |
| CN | 103124816 A | | 5/2013 | |
| CN | 105732999 A | * | 7/2016 | ............. C08J 3/075 |
| CN | 107446144 A | * | 12/2017 | ............. C08F 220/56 |
| CN | 109457472 A | * | 3/2019 | ............. C02F 1/286 |
| CN | 110078866 A | * | 8/2019 | |
| CN | 110820065 A | * | 2/2020 | ......... C08F 290/062 |
| EP | 269393 A2 | * | 6/1988 | ............. A61L 15/60 |
| EP | 301542 A2 | * | 2/1989 | ............. A61L 15/60 |
| EP | 342919 A2 | * | 11/1989 | ......... D06M 13/342 |
| GB | 2377939 A | * | 1/2003 | ....... A61F 13/00034 |
| JP | 05125123 A | * | 5/1993 | ............. C08F 220/06 |
| JP | 07155591 A | * | 6/1995 | |
| JP | H07155591 A | | 6/1995 | |
| JP | 08073507 A | * | 3/1996 | |
| JP | 108073507 A | | 3/1996 | |
| JP | H08154195 A | | 6/1996 | |
| JP | 10316874 A | * | 12/1998 | |
| JP | 2001277398 A | * | 10/2001 | |
| JP | 2002172139 A | | 6/2002 | |
| JP | 2004292592 A | * | 10/2004 | |
| JP | 3620866 B2 | | 2/2005 | |
| JP | 2005111474 A | * | 4/2005 | ............. A61L 15/60 |
| JP | 2006507374 A | | 3/2006 | |
| JP | 2009073162 A | * | 4/2009 | |
| JP | 2014181276 A | * | 9/2014 | |
| JP | 2017222826 A | * | 12/2017 | |
| JP | 2018027998 A | | 2/2018 | |
| JP | 2018166876 A | | 11/2018 | |
| JP | 2019111032 A | | 7/2019 | |
| JP | 2020018480 A | | 2/2020 | |
| KR | 20040070245 A | | 8/2004 | |
| KR | 20110105610 A | | 9/2011 | |
| KR | 2015144591 A | * | 12/2015 | |
| KR | 20180128462 A | | 12/2018 | |
| KR | 20190020911 A | | 3/2019 | |
| KR | 20190024643 A | | 3/2019 | |
| KR | 20190071619 A | | 6/2019 | |
| KR | 20190085162 A | | 7/2019 | |

(56) References Cited

FOREIGN PATENT DOCUMENTS

| | | | | | |
|---|---|---|---|---|---|
| KR | 2079569 | B1 | * | 2/2020 | ............ B32B 27/12 |
| NL | 8500429 | A | * | 4/1986 | ......... B29C 47/0004 |
| TW | 201627362 | A | * | 8/2016 | ............ C08F 220/60 |
| WO | WO-0238097 | A1 | * | 5/2002 | ......... A61F 13/0203 |
| WO | 2013018571 | A1 | | 2/2013 | |
| WO | WO-2017051734 | A1 | * | 3/2017 | ................ C08F 2/44 |
| WO | 2018034116 | A1 | | 2/2018 | |
| WO | 2018116478 | A1 | | 6/2018 | |
| WO | WO-2019039800 | A1 | * | 2/2019 | ............ B01J 20/103 |
| WO | WO-2019117670 | A1 | * | 6/2019 | ............ A61L 15/60 |
| WO | WO-2019216591 | A1 | * | 11/2019 | ............ A61L 15/60 |
| WO | WO-2019216592 | A1 | * | 11/2019 | ............ B01J 20/261 |

OTHER PUBLICATIONS

Machine Translation of JP-08073507-A, Mar. 1996 (Year: 1996).*
Google Translation of NL-8500429-A, Apr. 1986 (Year: 1986).*
Lee et al., Rapid Accessible Fabrication and Engineering of Bilayered Hydrogels: Revisiting the Cross-Linking Effect on Superabsorbent Poly(acrylic acid), Mar. 2018, ACS Omega, vol. 3, No. 3, pp. 3096-3103 (Year: 2018).*
Li et al., Fabrication of mechanically tough and self-recoverable nanocomposite hydrogels from polyacrylamide grafted cellulose nanocrystal and poly(acrylic acid), Oct. 2018, Carbohydrate Polymers, vol. 198, pp. 1-8 (Year: 2018).*
Yang et al., Studies on the properties and formation mechanism of flexible nanocomposite hydrogels from cellulose nanocrystals and poly(acrylic acid), Sep. 2012, Journal of Materials Chemistry, vol. 22, pp. 22467-22480 (Year: 2012).*
Kim et al, Swelling and mechanical properties of superporous hydrogels of poly(acrylamide-co-acrylic acid)/polyethylenimine interpenetrating polymer networks, Jan. 2004, Polymer, vol. 45, No. 1, pp. 189-196 (Year: 2004).*
Sennakesavan et al., Acrylic acid/acrylamide based hydrogels and its properties—A review, Oct. 2020, Polymer Degradation and Stability, vol. 180, p. 109308 (Year: 2020).*
Henderson et al., Ionically Cross-Linked Triblock Copolymer Hydrogels with High Strength, Jul. 2010, Macromolecules, vol. 43, No. 14, pp. 6193-6201 (Year: 2020).*
Search Report dated Mar. 21, 24 from the Office Action for Chinese Application No. 202180013763.8 issued Mar. 25, 24, pp. 1-3.
International Search Report for Application No. PCT/KR2021/095082 mailed Jan. 12, 2022, pp. 1-3.
Schwalm, Reinhold, "UV Coatings: Basics, Recent Developments and New Applications", Elsevier Science (Dec. 2006). 3 pgs.
Odian, George, "Principles of polymerization", 2nd ed., Wiley-Interscience New York, Oct. 1981.3 pgs.

* cited by examiner

POLYMER FILM, PREPARATION METHOD THEREOF, AND POLYMER FILM LAMINATE COMPRISING THE SAME

CROSS-REFERENCE TO RELATED APPLICATION(S)

The present application is a national phase entry under 35 U.S.C. § 371 of International Application No. PCT/KR2021/095082, filed on Sep. 7, 2021, which claims priority to Korean Patent Application No. 10-2020-0114813, filed on Sep. 8, 2020, Korean Patent Application No. 10-2020-0114814, filed on Sep. 8, 2020, and Korean Patent Application No. 10-2021-0118477, filed on Sep. 6, 2021, the disclosures of which are incorporated herein by reference in their entirety.

TECHNICAL FIELD

The present disclosure relates to a polymer film, a preparation method of the same, and a polymer film laminate including the polymer film.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In general, hygiene products such as various diapers, sanitary napkins, or pads for urinary incontinence include an absorber containing super absorbent polymer particles. It was common that the absorber mainly includes the super absorbent polymer particles and fluff pulp to properly fasten the super absorbent polymer particles while maintaining the shape of the absorber and hygiene products.

However, due to the presence of the fluff pulp, it was difficult to make the absorber and hygiene products slim and thin, and there was a problem such as poor wearability in which wearer's skin against the hygiene product becomes sweaty. Moreover, since the fluff pulp is mainly obtained from wood as a raw material, it has been contrary to the recent environmental protection trend, and the use of the fluff pulp has become one of the main reasons of increasing manufacturing costs of sanitary products.

In addition, current super absorbent polymers are mostly manufactured and used in the form of powder. This powder-type super absorbent polymer has limitation in the range of use and thinning, because it may be scattered or leaked when manufacturing sanitary materials or in actual use and should be used with a specific type of substrate. Further, since absorption performance of the absorber may vary depending on the content distribution of the super absorbent polymer particles, it is difficult to uniformly control the absorption characteristics.

Meanwhile, in order to solve the above problems, a sheet-type super absorbent polymer has been proposed. For example, a method for preparing a sheet-type super absorbent polymer by kneading an acrylic acid-based monomer or pulverizing a hydrogel polymer obtained after polymerization to obtain a particulate hydrogel polymer, followed by molding is known. However, since a diameter of the hydrogel polymer particles is about 0.2 to 2.0 mm, the above method had a limitation in providing an ultra-thin sheet having a thickness of 0.5 mm or less, and there was a problem in that an auxiliary substance such as fluff pulp is still required to secure shape retention and absorbency.

Accordingly, there is a need for research on a new type of super absorbent polymer, which does not require an auxiliary substance such as fluff pulp, can be reduced in thickness, and exhibits excellent absorption properties, and a preparation method of the same. In addition, research on a laminate including the new super absorbent polymer is also being actively conducted.

DETAILED DESCRIPTION OF THE INVENTION

Technical Problem

In order to solve the above problems, there are provided a film-type polymer (super absorbent polymer) and a preparation method thereof, which can replace the existing powder-type super absorbent polymer, has excellent absorption performance by including a pattern, and has good portability by exhibiting a low weight per unit area.

In addition, there is provided a polymer film laminate including the polymer film.

Technical Solution

According to one embodiment of the present disclosure, there is provided a polymer film including
a polymer obtained by polymerizing an acrylic acid-based monomer having at least partially neutralized acidic groups,
wherein a thickness is 0.001 mm or more and 0.5 mm or less,
the polymer film includes a pattern having a hole structure penetrating the film, and
an elongation calculated by the following Equation 1 is 100% or more:

$$\text{Elongation (\%)} = (L_1 - L_0)/L_0 * 100 \qquad \text{[Equation 1]}$$

in the Equation 1,
$L_0$ is an initial gauge length, and
$L_1$ is a gauge length at fracture when the specimen is pulled at a rate of 0.5 mm per minute.

In addition, according to another embodiment of the present disclosure, there is provided a preparation method of the above polymer film, including the steps of:
preparing a monomer composition by mixing an acrylic acid-based monomer having at least partially neutralized acidic groups, a cellulose-based thickener, a moisturizing agent, a polymerization initiator, and a solvent;
forming a monomer composition film by casting the monomer composition on a substrate;
forming a hydrogel polymer film by irradiating heat or light while drawing the monomer composition film;
drying the hydrogel polymer film to form a dried polymer film; and
forming a polymer film by forming a pattern on the dried polymer film.

In addition, according to another embodiment of the present disclosure, there is provided a polymer film laminate including a non-woven fabric; and
    a polymer film above and below the non-woven fabric, wherein the polymer film
    (1) includes a polymer obtained by polymerizing an acrylic acid-based monomer having at least partially neutralized acidic groups,
    (2) has a thickness of 0.001 mm or more and 0.5 mm or less,
    (3) includes a pattern having a hole structure penetrating the film, and
    (4) has an elongation calculated by the following Equation 1 of 100% or more:

$$\text{Elongation (\%)} = (L_1 - L_0)/L_0 * 100 \quad \text{[Equation 1]}$$

in the Equation 1,
$L_0$ is an initial gauge length, and
$L_1$ is a gauge length at fracture when the specimen is pulled at a rate of 0.5 mm per minute.

Advantageous Effects

According to the present disclosure, it is possible to prepare a polymer film having a thin thickness and excellent absorption performance, thereby exhibiting excellent flexibility and tensile strength.

In addition, the polymer film of the present disclosure can be manufactured into a product without scattering or leaking, and an auxiliary substance such as fluff pulp is unnecessary, so that it is possible to make products thinner and to reduce the manufacturing process and costs.

In addition, it is possible to prepare a polymer film laminate having improved absorption performance by including a polymer film having a thin thickness and exhibiting excellent absorption performance, and a non-woven fabric.

BRIEF DESCRIPTION OF THE DRAWINGS

FIG. 5 is a pattern of the polymer film of Example 1-9. The polymer film includes a pattern having a rectangular hole structure 1 which has an arrangement in which one side of a face-centered cubic structure is repeated, and the rectangle indicated by the red dotted line is its smallest repeating unit 2. In the rectangular hole structure, a width 3 is 6.06 mm, a length 4 is 0.25 mm, a horizontal distance between holes 5 is 1.12 mm, and a vertical distance between holes 6 is 1.72 mm.

BEST MODE FOR CARRYING OUT THE INVENTION

Detailed Description of the Embodiments

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

In the polymer film of the present disclosure, the polymer refers to a super absorbent polymer.

In the present disclosure, there is provided a film-type polymer, that is, a super absorbent polymer that can be used as an absorber by itself without an auxiliary agent such as pulp due to its excellent absorbency, and is free from scattering or leaking. In particular, the polymer film of the present disclosure has improved absorption performance by including a pattern having a hole structure penetrating the film, and has a light weight per unit area, making portability better when applied to products.

According to one embodiment of the present disclosure, there is provided a polymer film including a polymer obtained by polymerizing an acrylic acid-based monomer having at least partially neutralized acidic groups, wherein a thickness is 0.001 mm or more and 0.5 mm or less, the polymer film includes a pattern having a hole structure penetrating the film, and an elongation calculated by the following Equation 1 is 100% or more:

$$\text{Elongation (\%)} = (L_1 - L_0)/L_0 * 100 \quad \text{[Equation 1]}$$

in the Equation 1,
$L_0$ is an initial gauge length, and $L_1$ is a gauge length at fracture when the specimen is pulled at a rate of 0.5 mm per minute.

In the present disclosure, "thickness" means a width between both sides of the film.

In general, the super absorbent polymer is obtained by polymerizing an acrylic acid-based monomer in the presence of a cross-linking agent to obtain a hydrogel polymer, and then drying, pulverizing and classifying the hydrogel polymer to prepare a base resin, followed by performing surface modification. The super absorbent polymer prepared in this way is in the form of a powder having a particle size of about 150 to 850 μm, and is mixed and compounded with an auxiliary substance such as fluff pulp to be applied to the product.

However, the powder-type super absorbent polymer may scatter or leak from the product during the manufacturing process of an absorbent core, and it is difficult to uniformly disperse the polymer in the product, making it difficult to uniformly control absorption performance. In addition, it requires an auxiliary substance, so that there is a limitation in thinning the product.

In addition, it is known that the existing sheet-type super absorbent polymer is manufactured by rolling a powder- or particulate-type super absorbent polymer or fixing the super absorbent polymer to a support such as a non-woven fabric for shape retention. However, the sheet-type super absorbent polymer prepared in this method has low process efficiency due to a complicated manufacturing method, and requires a lot of components other than the super absorbent polymer to be fixed to the support. Therefore, there is a limitation in increasing the content of the super absorbent polymer present in the final product, and absorption property is not good. In addition, even when a powder- or particulate-type super absorbent polymer or a particulate-type hydrogel polymer is rolled to form a sheet, it is necessary to undergo a mixing process with a molding agent and a molding process after polymerization of the monomer. Thus, the manufacturing method is complicated and there is a limitation in thinning the product. Further, in order to bind the super absorbent polymer and form a sheet, it is necessary to include a molding auxiliary substance such as fiber or pulp, so that the absorption property is also poor.

Accordingly, the present inventors have conducted research on a new type of super absorbent polymer that does not require an auxiliary substance such as pulp, can be thinned, does not scatter, and can be used as an absorber by itself, resulting in the present technology.

The polymer (super absorbent polymer) film prepared according to the present disclosure is in the form of a thin film rather than a powder, so there is no risk of scattering or leaking from the product during handling, and can be used without a separate auxiliary substance such as fluff pulp, and exhibits excellent absorption properties by itself.

In the present disclosure, the polymer film refers to a super absorbent polymer in the form of a flexible and thin layer or film having a moisture content of 15 wt % or less, or 12 wt % or less, and preferably 11 wt % or less. Preferably, the moisture content of the polymer film is 15 wt % or less, 12 wt % or less, 11 wt % or less, or 10 wt % or less, and 1 wt % or more, 2 wt % or more, 4 wt % % or more, or 6 wt % or more.

Meanwhile, the "moisture content" in the present disclosure indicates the amount of moisture contained in the sample as a percentage with respect to the weight of the sample before drying. That is, the moisture content can be calculated by dividing a value obtained by subtracting the weight after drying of the sample from the weight before drying of the sample by the weight before drying of the sample, and then multiplying by 100. At this time, the drying condition for measuring the moisture content is that the temperature is increased to about 150° C. and maintained at 150° C., and the total drying time is 20 min including 5 min of a heating step.

The polymer film prepared according to the present disclosure may have a moisture content of 15% or less, and may be in the form of a colorless, transparent, elastic, and flexible film.

The transparent polymer film means that a total light transmittance with respect to visible light is 89.5% or more when the thickness is in the range of 0.001 to 0.5 mm. The total light transmittance of the polymer film according to the embodiment of the present disclosure may be 90% or more, 90.4% or more, 91% or more, 91.5% or more, or 92% or more. The total light transmittance may be theoretically 100%, for example, it may be 99% or less.

In addition, the polymer film of the present disclosure may have a yellow index of 2.6 or less, 2.5 or less, 2.4 or less, 2.3 or less, 1.9 or less, 1.5 or less, or 1.3 or less, when measured in accordance with ASTM D1925 with a thickness of 0.001 to 0.5 mm.

The polymer film includes a pattern having a hole structure penetrating the film while satisfying the above-described thickness. The hole structure of the present disclosure may be understood as a hole shape penetrating the film. The shape of the hole structure, the size such as a maximum diameter, the distance between the holes, and the arrangement thereof are not particularly limited as long as physical properties such as absorption rate and centrifuge retention capacity, which will be described later, are satisfied.

Figure 2:
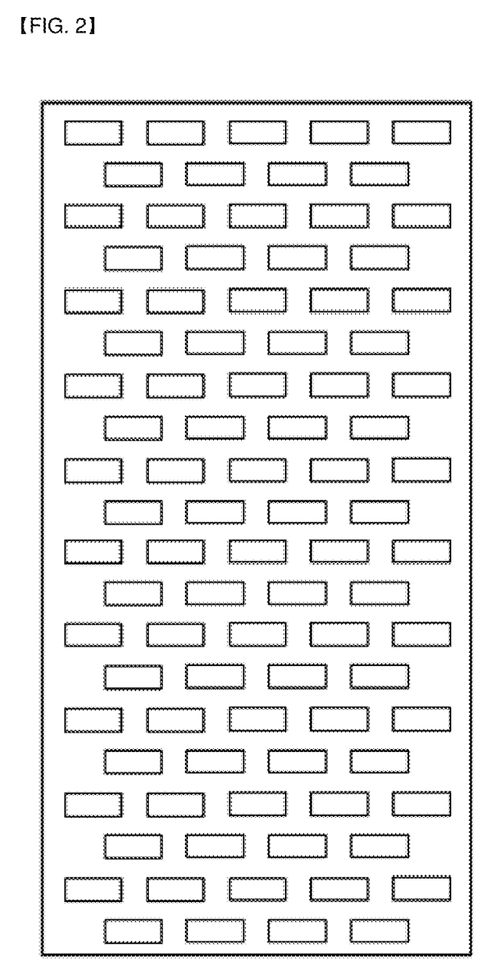
FIG. 2 is a polymer film including a pattern having a rectangular hole structure.

Specifically, the cross-sectional shape of the hole structure is not particularly limited as long as physical properties such as absorption rate and centrifuge retention capacity, which will be described later, are satisfied. For example, a circle-like shape such as a circle or an ellipse is preferable, and the repeated hole structure may be a rectangle as shown in FIG. 2. In addition, although the size and shape of the hole structures included in the single polymer film may be different from each other, it is preferable that the hole structures have the same size and shape.

Figure 1:
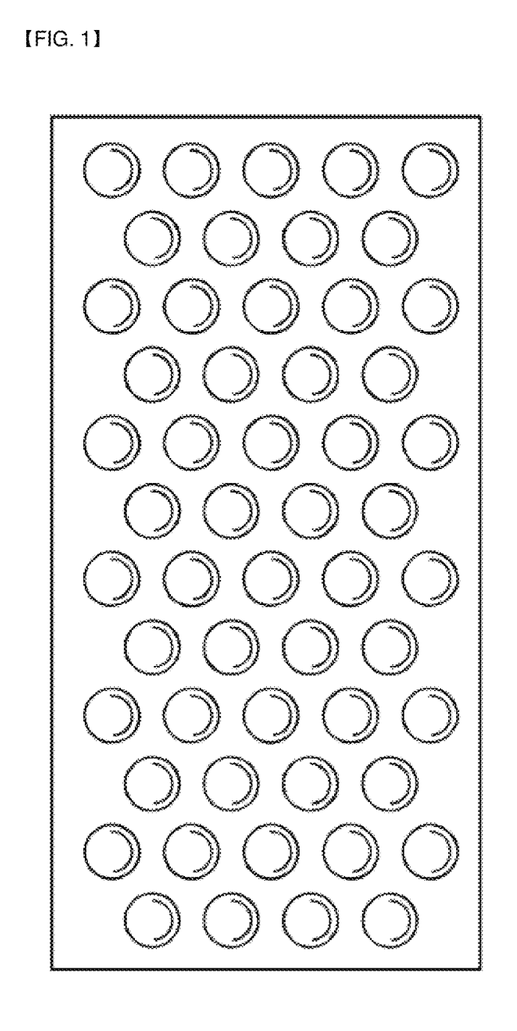
FIG. 1 is a polymer film including a pattern having a circular hole structure where the holes of the film have an arrangement in which one side of a simple cubic structure is repeated.

Meanwhile, the hole structure of the polymer film may be arranged without any particular limitation as long as physical properties such as absorption rate and centrifuge retention capacity, which will be described later, are satisfied, such as randomly arranged or arranged at regular intervals in the polymer film. Preferably, the pattern in which the hole structure is repeated may be arranged such that one side of the simple cubic structure is repeated, or one side of the face-centered cubic structure is repeated when holes with the same size are repeated. For example, as shown in FIG. 1, a circular hole structure may be arranged in a pattern in which one side of a simple cubic structure is repeated.

A maximum diameter of the hole included in the pattern of the polymer film is not particularly limited as long as physical properties such as absorption rate and centrifuge retention capacity, which will be described later, are satisfied. For example, it may be 1 mm or more and 15 mm or less, and preferably, 2 mm or more, or 3 mm or more, and 13 mm or less, 11 mm or less, 10 mm or less, or 8 mm or less. If it is less than the above range, the effect of improving the absorption rate may be insignificant, and if it exceeds the above range, leakage of moisture such as salt water may occur.

Figure 3:
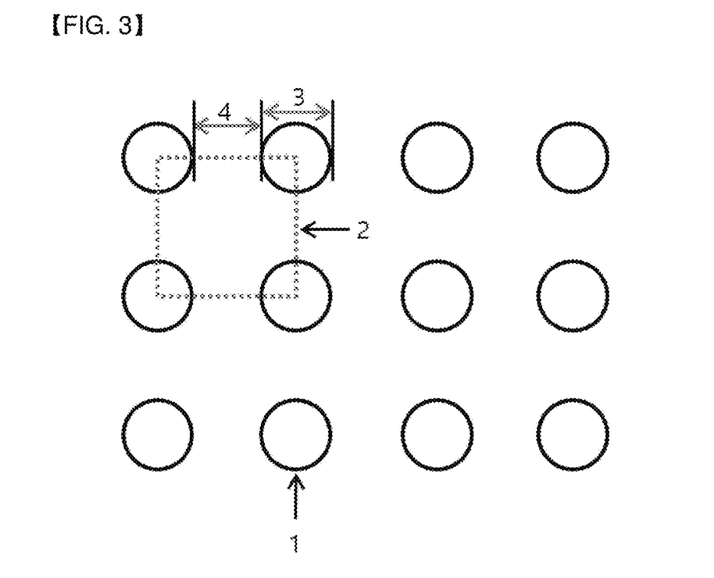
FIG. 3 is a schematic diagram of a polymer film including a pattern having a circular hole structure 1 which has an arrangement in which one side of a simple cubic structure is repeated. In the arrangement in which one side of a simple cubic structure is repeated, a smallest repeating unit 2 in the form of a square indicated by a red dotted line is repeated in all directions. At this time, a length obtained by subtracting a diameter of the hole 3 from a length of one side of the square, which is the smallest repeating unit 2, is a distance between the holes 4.
Figure 4:
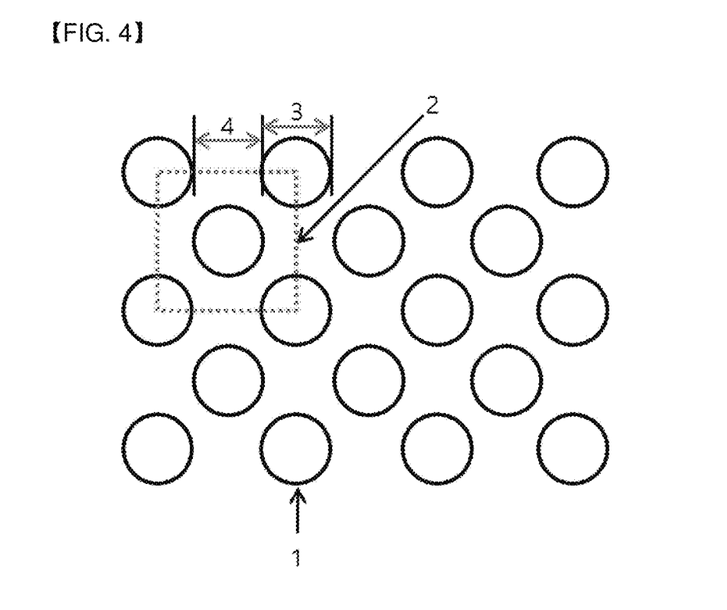
FIG. 4 is a schematic diagram of a polymer film including a pattern having a circular hole structure 1 which has an arrangement in which one side of a face-centered cubic structure is repeated. In the arrangement in which one side of a face-centered cubic structure is repeated, a smallest repeating unit 2 in the form of a square indicated by a red dotted line is repeated in all directions. At this time, a length obtained by subtracting a diameter of the hole 3 from a length of one side of the square, which is the smallest repeating unit 2, is a distance between the holes 4.

A distance between holes in the polymer film is not particularly limited as long as physical properties such as absorption rate and centrifuge retention capacity, which will be described later, are satisfied. For example, it may be 1 mm or more and 10 mm or less, and preferably, 2 mm or more, or 3 mm or more, and 9 mm or less, or 8 mm or less. Herein, the "distance between holes" means a distance between one hole and another hole closest to the hole when the hole structure is randomly arranged on the film. When a certain arrangement is repeated, it means a length obtained by subtracting the diameter of the hole from the length of one side of the polygon, which is the smallest repeating unit of the arrangement. For example, when the circular hole structure of the polymer film has an arrangement in which one side of a simple cubic structure is repeated, the one side has a square shape, so that a length obtained by subtracting the diameter of the hole from the length of the one side of the square is the distance between the holes. The same can be applied in the case of a hole structure having an arrangement in which one side of the face-centered cubic structure is repeated. The arrangement in which one side of the simple cubic structure is repeated may be understood with reference to FIG. 3, and the arrangement in which one side of the face-centered cubic structure is repeated may be understood with reference to FIG. 4.

A total area of the holes included in the pattern of the polymer film may be 15% or more, 18% or more, or 20% or more, and 80% or less, 70% or less, 60% or less, or 50% or less of the area of the polymer film. If it is less than the above range, the effect of improving the absorption rate may be insignificant, and if it exceeds the above range, leakage of moisture such as salt water may occur.

Meanwhile, when the thickness of the polymer film is 0.2 mm, a weight per unit area may be 100 g/m² or more and 210 g/m² or less. Preferably, the weight per unit area may be 110 g/m² or more, 120 g/m² or more, or 130 g/m² or more, and 205 g/m² or less, or 200 g/m² or less. The weight per unit area of the polymer film is proportional to the thickness. That is, when the thickness of the polymer film is 0.1 mm, the weight per unit area may be 50 g/m² or more and 105 g/m² or less. The smaller the weight per unit area, the better the portability. If it is less than the above range, the absorbency per area for brine may be insufficient, and if it exceeds the above range, physical properties such as the absorbency per unit weight for brine may be reduced.

Preferably, an absorption rate of the polymer film may be 50 seconds or less, 45 seconds or less, 43 seconds or less, 41 seconds or less, or 40 seconds or less. As the smaller absorption rate can be evaluated as the better, there is no lower limit, but may be, for example, 10 seconds or more, 15 seconds or more, 20 seconds or more, or 25 seconds or more. The absorption rate is measured by the following method. A specimen is prepared by cutting the polymer film to a size of 10 cm*25 cm (width*length) to have smooth cut surface, and a non-woven fabric with the same size is attached above and below the polymer film. Then, a cylindrical plastic tube with an inner diameter of 60 mm is placed in the center of the polymer film, and 80 ml of 0.9 wt % saline is added at a rate of 15 ml/s using a funnel, followed by measuring the time taken until all the saline is absorbed.

Preferably, centrifuge retention capacity of the polymer film may be 30 g/g or more, 31 g/g or more, 32 g/g or more, 33 g/g or more, 34 g/g or more, or 35 g/g or more, and 50 g/g or less, 45 g/g or less, 43 g/g or less, 40 g/g or less, 38 g/g or less, or 37 g/g or less. The centrifuge retention capacity is measured according to the EDANA WSP 241.2.

Specifically, the polymer film is cut to have a weight (W0) of 0.08 to 0.12 g, put in a non-woven envelope, and sealed. Then, it is immersed in 0.9 wt % sodium chloride aqueous solution (physiological saline) at room temperature. After 30 minutes, the envelope is centrifuged at 250G for 3 minutes to drain, and the weight W2 (g) of the envelope is measured. Further, after carrying out the same operation without using the polymer film, the weight W1 (g) of the envelope is measured. Then, CRC (g/g) is calculated by using the obtained weight values according to the following Equation 2.

$$CRC\ (g/g) = \{[W2(g) - W1(g)]/W0(g)\} - 1 \qquad \text{Equation 2.}$$

Specifically, the polymer film of the present disclosure may have an elongation of 100% or more, 150% or more, 180% or more, or 200% or more, and 550% or less, 530% or less, or 510% or less when the thickness is 0.001 to 0.5 mm. When the elongation is 100% or more, it is advantageous for changing the shape of the film such as shrinkage and expansion when using the film. In this case, the elongation may be calculated according to the Equation 1, and the measurement method may be specified in Examples to be described later.

Preferably, the polymer film may have an absorption rate of 10 seconds or more and 50 seconds or less, and an elongation of 100% or more and 550% or less.

The polymer film has improved absorption performance such as initial absorption rate while maintaining centrifuge retention capacity similar to that of conventional powder- or particulate-type super absorbent polymers. Accordingly, it may be used in absorbent cores of hygiene products such as diapers and sanitary napkins, wallpaper with moisture absorption and desorption property, absorbent pads for food for maintaining freshness in the food distribution field, pee pads for pets, medical bands, or the like.

Meanwhile, according to another embodiment of the present disclosure, there is provided a preparation method of the polymer film.

Specifically, the polymer film may be prepared by a preparation method including the steps of:
preparing a monomer composition by mixing an acrylic acid-based monomer having at least partially neutralized acidic groups, a cellulose-based thickener, a moisturizing agent, a polymerization initiator, and a solvent;
forming a monomer composition film by casting the monomer composition on a substrate;
forming a hydrogel polymer film by irradiating heat or light while drawing the monomer composition film;
drying the hydrogel polymer film to form a dried polymer film; and
forming a polymer film by forming a pattern on the dried polymer film.

In the present disclosure, a monomer composition film is prepared from a monomer composition solution having a controlled viscosity by a solution casting method, and then polymerized and dried to prepare a polymer (super absorbent polymer) in the form of a film.

In particular, since a pattern is formed after drying in the present disclosure, a pattern having a hole structure penetrating the polymer film is formed, and accordingly, a polymer film having improved absorption performance such as absorption rate and reduced weight per unit area can be manufactured.

In the preparation method of the present disclosure, the monomer composition, which is a raw material of the polymer, contains an acrylic acid-based monomer having at least partially neutralized acidic groups, a cellulose-based thickener, a moisturizing agent, a polymerization initiator, and a solvent.

First, the acrylic acid-based monomer is a compound represented by the following Chemical Formula 1:

[Chemical Formula 1]

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes at least one selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 mol %, or 45 to 75 mol %. The range of the degree of neutralization can be adjusted according to final properties. An excessively high degree of neutralization causes the neutralized monomers to be precipitated, and thus polymerization may not readily occur, whereas an excessively low degree of neutralization may deteriorate the absorbency of the polymer.

In a preferred embodiment, potassium hydroxide (KOH) may be used as the alkali substance. In particular, when using potassium hydroxide, a polymer film having better flexibility and dimensional stability may be prepared even with the moisture content of 10% or less.

The concentration of the acrylic acid-based monomer may be about 20 to about 60 wt %, preferably about 40 to about 50 wt %, based on the monomer composition including the raw materials of the polymer and the solvent, and it may be appropriately selected in consideration of the reaction time and the reaction conditions. However, when the concentration of the monomer is excessively low, the yield of the polymer is low and there may be a problem in economic efficiency. In contrast, when the concentration is excessively high, a problem may occur in the process such as some of the monomer is precipitated, and thus physical properties of the polymer may be deteriorated.

Meanwhile, in the present disclosure, a thickener and a moisturizing agent are contained in the monomer composition so that the monomer composition can be applied in the form of a film by a solution casting method.

As the thickener and the moisturizing agent are contained at the same time, the monomer composition of the present disclosure may exhibit a viscosity suitable for casting in the form of a film, can maintain an appropriate moisture content in the polymerization process after film casting, and the polymer film to be prepared may have high flexibility.

In the present disclosure, a cellulose-based thickener is used as the thickener, and specifically, at least one selected from the group consisting of nanocellulose, hydroxyethylcellulose, hydroxypropylcellulose, hydroxyethylmethylcellulose, and hydroxypropylmethylcellulose may be used. Preferably, nanocellulose, hydroxyethylcellulose, or a combination thereof may be used.

The cellulose-based thickener may be contained in an amount of 0.01 parts by weight or more, 0.1 parts by weight or more, 0.2 parts by weight or more, or 0.4 parts by weight or more, and 5 parts by weight or less, 3 parts by weight or less, 1 parts by weight or less, or 0.9 parts by weight or less based on 100 parts by weight of the solid content in the monomer composition.

Herein, the solid content in the monomer composition refers to all components of the composition excluding the solvent. That is, the solid content refers to the total content of an acrylic acid-based monomer, an alkali material for neutralizing the acrylic monomer, a cellulose-based thickener, a moisturizing agent, a cross-linking agent, a thermal initiator, a photoinitiator, and an internal cross-linking agent.

If the content of the cellulose-based thickener is less than 0.01 parts by weight based on 100 parts by weight of the solid content in the monomer composition, sufficient thickening effect cannot be ensured, so it may be difficult to prepare a monomer composition film. Conversely, if it exceeds 5 parts by weight, the viscosity of the monomer composition becomes excessively high, so that the thickness of the film becomes thick, and it may be difficult to uniformly control the thickness of the film.

As the moisturizing agent, a substance normally used as a moisturizing component in pharmaceuticals, cosmetics, chemical products, and the like may be used without limitation. Examples of the moisturizing agent include at least one selected from the group consisting of polyhydric alcohols having two or more hydroxyl groups in a molecule, citric acid, and citrate.

Specifically, as the polyhydric alcohol, a C3 to C30 polyhydric alcohol having 3 to 12 hydroxyl groups in a molecule may be used. For example, the polyhydric alcohol may be at least one selected from the group consisting of glycerin; diglycerin; propylene glycol; butylene glycol; sorbitol; polyethylene glycol; polyglycerin-3; polyglycerin-6; polyglycerin-10; and polyglyceryl-10 distearate and a derivative thereof (C3 to C18). Among them, at least one selected from the group consisting of glycerin, diglycerin, ethylene glycol, and sorbitol may be preferably used.

In addition, citric acid and/or citrate may also be used as the moisturizing agent. Examples of the citrate include triethylcitrate, methylcitrate, sodium citrate, trisodium 2-methylcitrate, and the like.

The moisturizing agent may be used in an amount of 5 parts by weight or more, 10 parts by weight or more, 20 parts by weight or more, or 30 parts by weight or more, and 70 parts by weight or less, 60 parts by weight or less, or 50 parts by weight or less based on 100 parts by weight of the acrylic acid-based monomer.

If the content of the moisturizing agent is less than 5 parts by weight based on 100 parts by weight of the acrylic acid-based monomer, the moisture content of the monomer composition film is not sufficient, so that the film may dry out or crumble in the subsequent polymerization and drying process and flexibility of the polymer film to be prepared cannot be achieved. Conversely, if the content of the moisturizing agent exceeds 70 parts by weight based on 100 parts by weight of the acrylic acid-based monomer, there may be a problem in that absorbency of the polymer film is reduced. Therefore, the content of the moisturizing agent preferably satisfies the above range.

The monomer composition may optionally contain an internal cross-linking agent for cross-linking the polymer. As the internal cross-linking agent, those used in the preparation of a cross-linked polymer of a conventional super absorbent polymer may be used. The internal cross-linking agent may be a cross-linking agent having one or more ethylene-based unsaturated groups in addition to one or more functional groups which may react with a water-soluble substituent of the acrylic acid-based monomer; or a cross-linking agent having two or more functional groups which may react with a water-soluble substituent of the monomer and/or a water-soluble substituent formed by hydrolysis of the monomer.

As the specific example of the internal cross-linking agent, a C8-C12 bisacrylamide, bismethacrylamide, a poly (meth)acrylate of C2-C10 polyol, a poly(meth)allylether of C2-C10 polyol, or the like may be used. More specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, polyethylene glycol diacrylate, triallylamine, triaryl cyanurate, triallyl isocyanate, polyethylene glycol, diethylene glycol and propylene glycol may be used. In one embodiment, polyethylene glycol diacrylate may be used as the internal cross-linking agent.

This internal cross-linking agent may be contained in a concentration of 3000 ppm or less with respect to the monomer composition, so that the polymerized polymer can be cross-linked. In one embodiment, the internal cross-linking agent may be contained in 10 ppm or more, 50 ppm or more, 100 ppm or more or 500 ppm or more, and 3000 ppm or less, 2500 ppm or less, or 2000 ppm or less.

In the preparation method of the super absorbent polymer film of the present disclosure, the polymerization initiator generally used in the preparation of a super absorbent polymer may be used without limitation.

Specifically, as the polymerization initiator, a thermal polymerization initiator or a photopolymerization initiator with UV irradiation may be used depending on a polymerization method. However, even when the photopolymerization method is applied, a certain amount of heat is generated by UV radiation and the like, and some heat occurs as the polymerization reaction, an exothermal reaction, progresses. Therefore, the composition may additionally include the thermal polymerization initiator. In a preferred embodiment, a photopolymerization initiator and a thermal polymerization initiator may be used simultaneously as the polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO (2,4,6-Trimethylbenzoyldiphenylphosphine oxide), Irgacure 819 (Phenylbis(2,4,6-trimethylbenzoyl)phosphine oxide), and the like may be used. More various photopolymerization initiators are well disclosed in "UV Coatings: Basics, Recent Developments and New Application (Elsevier, 2007)" written by Reinhold Schwalm, p 115, and the present disclosure is not limited thereto.

A concentration of the photopolymerization initiator in the monomer composition may be 10 ppm or more, 20 ppm or more, or 40 ppm or more, and 2000 ppm or less, 1000 ppm or less, 500 ppm or less, or 100 ppm or less. If the concentration of the photopolymerization initiator is excessively low, the polymerization rate may become slow, and if the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

A concentration of the thermal polymerization initiator in the monomer composition may be 10 ppm or more, 100 ppm or more, or 500 ppm or more, and 2000 ppm or less, 1500 ppm or less, or 1000 ppm or less. If the concentration of the thermal polymerization initiator is excessively low, additional thermal polymerization hardly occurs and the effect of adding the thermal polymerization initiator may be insufficient. If the concentration of the thermal polymerization initiator is excessively high, the molecular weight of the super absorbent polymer may become low and the properties may be uneven.

In the preparation method of the present disclosure, the monomer composition may further contain an additive such as a plasticizer, a preservation stabilizer, an antioxidant, or the like, if necessary.

Raw materials such as the acrylic acid-based unsaturated monomer, internal cross-linking agent, polymerization initiator, and additive are prepared in the form of a monomer composition solution dissolved in a solvent.

Any solvent which can dissolve the components may be used without limitation, and for example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used alone or in combination. For example, water may be used as the solvent.

In the present disclosure, the monomer composition exhibits a viscosity suitable for a solution casting method by containing a cellulose-based thickener and a moisturizing agent. Specifically, the viscosity at 25° C. of the monomer composition may be 100 mPa·s or more, 150 mPa·s or more, 200 mPa·s or more, or 240 mPa·s or more, and 5000 mPa·s or less, 2300 mPa·s or less, 2000 mPa·s or less, or 1600 mPa·s or less. The viscosity of the monomer composition may be measured with a viscometer (e.g., TV-22 manufactured by TOKI) under the conditions of spindle #1 and a rotational speed of 1 rpm.

If the viscosity of the monomer composition is less than 100 mPa·s, it may be difficult to cast the monomer composition to a uniform thickness. Conversely, if the viscosity of the monomer composition is more than 5000 mPa·s, it is difficult to prepare a uniform monomer composition, and flowability of the monomer composition is low, so that processability is deteriorated and defoaming is difficult.

The monomer composition is prepared, and then casted on a substrate to prepare a monomer composition film. Then, it is polymerized while drawing to form a hydrogel polymer film. Casting and polymerization of the monomer composition may be continuously performed through a roll-to-roll process.

First, a monomer composition film is prepared by applying a monomer composition on a substrate.

Unlike the general polymer solution casting method in which the solvent is removed after casting the polymer solution, the present disclosure immediately performs the drawing and polymerization process after the monomer composition is applied on the substrate so as not to decrease the moisture content.

If the moisture content of the monomer composition film is too low, components constituting the monomer composition may be precipitated before polymerization, and there may be a problem in that the film is broken after polymerization. Accordingly, the moisture content of the monomer composition film preferably satisfies the range of 30 wt % to 60 wt %, 30 wt % to 50 wt %, or 30 wt % to 45 wt %.

The thickness of the monomer composition film may be appropriately adjusted depending on the thickness of the desired polymer film. Although the thickness of the monomer composition film hardly changes during the polymerization step, the thickness may decrease by about 10 to 40% or 15 to 35% while the moisture content decreases during the drying process of the hydrogel polymer film after polymerization. In consideration of this, a monomer composition film may be prepared with an appropriate thickness.

For example, the thickness of the monomer composition film may be 0.8 mm or less, 0.6 mm or less, or 0.5 mm or less, and 0.001 mm or more, or 0.01 mm or more, but is not limited thereto. It can be appropriately adjusted depending on the composition of the monomer composition, specific conditions in the polymerization and drying steps, and the thickness of the desired polymer film.

Subsequently, a polymerization reaction is performed by irradiating heat and/or light while drawing the monomer composition film in the longitudinal direction (MD direction), thereby forming a hydrogel polymer film. Drawing the film during the polymerization can control physical properties such as tensile strength of the polymer film to be prepared.

At this time, the tension applied to the monomer composition film may be 40 N/m or more, 45 N/m or more, 50 N/m or more, or 60 N/m or more, and 100 N/m or less, 90 N/m or less, or 70 N/m or less. If the film is drawn by applying an excessively large tension, the monomer composition film may be broken or the thickness may be excessively thin. If the tension is too small, physical properties such as tensile strength of the film may not be secured.

The polymerization temperature may be appropriately adjusted depending on the composition of the monomer composition, but is preferably 40 t or more, or 50° C. or more for smooth reaction. In addition, if the temperature is too high, the solvent evaporates and components constituting the monomer composition may be precipitated. Therefore, the polymerization temperature is preferably 90° C. or less or 80° C. or less.

The moisture content of the hydrogel polymer film prepared through the polymerization step may be about 20 wt % or more, preferably 25 wt % or more, and 40 wt % or less, or 35 wt % or less. Accordingly, a dried polymer film is prepared by drying the hydrogel polymer film.

The temperature of the drying step may preferably be 80 to 150° C., or 90 to 100° C. Drying for about 5 to 30 minutes within the above temperature range may provide a dried polymer film having the moisture content of 15 wt % or less, 12 wt % or less, 10 wt % or less, or 9 wt % or less, and 1 wt % or more, 2 wt % or more, 4 wt % or more, or 6 wt % or more.

Thereafter, a pattern is formed on the dried polymer film to form a final polymer film. The pattern is a pattern having a hole structure penetrating the film, and the "hole structure" is the same as described above. Herein, the pattern may be formed in a Print and Cut method. A device used for the Print and Cut method is not particularly limited, and for example, a CAMEO Cutting Printer (manufactured by Silhouette) may be used.

The polymer film prepared according to the preparation method includes a pattern having a hole structure penetrating the film as described above, so that absorption performance such as absorption rate may be improved. Since the super absorbent polymer film of the present disclosure can be used as an absorbent by itself without compounding with an auxiliary substance such as pulp, it can be suitably used for slim and thin-film products, and can exhibit excellent absorption performance without deformation of the product.

Meanwhile, in the present disclosure, there is provided a polymer film laminate including a polymer in the form of a film and a non-woven fabric, wherein the polymer film can be used as an absorber by itself without an auxiliary agent such as pulp due to its excellent absorbency, and is free from scattering or leaking. In particular, the polymer film has improved absorption performance by including a pattern having a hole structure penetrating the film, and has a light weight per unit area, making it easier to carry when applied to products. In addition, since a non-woven fabric having a low density per unit area is included in the laminate, it is possible to provide a polymer film laminate having an excellent absorption rate while maintaining the centrifuge retention capacity at the same level.

The non-woven fabric is widely used for various purposes due to its excellent breathability and flexibility. In the present disclosure, it is included in the laminate together with the polymer film, thereby contributing to the improvement of the absorption rate. At this time, a weight per unit area of the non-woven fabric having a thickness of 0.25 mm may be 60 $g/m^2$ or less, 55 $g/m^2$ or less, 50 $g/m^2$ or less, or 45 $g/m^2$ or less, and 10 $g/m^2$ or more, 15 $g/m^2$ or more, 20 $g/m^2$ or more, 25 $g/m^2$ or more, or 30 $g/m^2$ or more. If the weight per unit area is less than 10 $g/m^2$, there are problems of difficulty in manufacturing the non-woven fabric and low strength, and if it exceeds 60 $g/m^2$, the absorption rate is lowered and permeability of upper and lower polymer films (SAP Film) may be lowered.

Meanwhile, according to one embodiment of the present disclosure, the polymer film laminate may include a polymer film above and below the non-woven fabric. Other laminated materials may be included between the non-woven fabric and the polymer film, but it is preferable that the non-woven fabric and the upper and lower polymer films are adjacent to each other.

As the polymer film included in the polymer film laminate, the above-described polymer film is applied.

In addition, the preparation method of the polymer film included in the polymer film laminate is as described above.

Meanwhile, the polymer film laminate of the present disclosure may have centrifuge retention capacity of 30 g/g or more and 50 g/g or less. The centrifuge retention capacity is measured according to the EDANA WSP 241.2.

Specifically, the polymer film is cut to have a weight (W0) of 0.08 to 0.12 g, put in a non-woven envelope, and sealed. Then, it is immersed in 0.9 wt % sodium chloride aqueous solution (physiological saline) at room temperature. After 30 minutes, the envelope is centrifuged at 250G for 3 minutes to drain, and the weight W2 (g) of the envelope is measured. Further, after carrying out the same operation without using the polymer, the weight W1 (g) of the envelope is measured. Then, CRC (g/g) is calculated by using the obtained weight values according to the following Equation 2.

$$CRC\ (g/g)=\{[W2(g)-W1(g)]/W0(g)\}-1 \qquad \text{Equation 2.}$$

In addition, the polymer film laminate of the present disclosure may have an absorption rate of 10 seconds or more, 12 seconds or more, 14 seconds or more, 16 seconds or more, 18 seconds or more, or 20 seconds or more, and 30 seconds or less, 28 seconds or less, 26 seconds or less, or 24 seconds or less. The absorption rate is measured by the following method. A polymer film laminate specimen is prepared by cutting the laminate to a size of 10 cm*25 cm (width*length) to have smooth cut surface. Then, a cylindrical plastic tube with an inner diameter of 60 mm is placed in the center of the laminate, and 80 ml of 0.9 wt % saline is added at a rate of 15 ml/s using a funnel, followed by measuring the time taken until all the saline is absorbed.

As the polymer film laminate includes the above-described non-woven fabric and the polymer film, the absorption performance such as an initial absorption rate is improved while maintaining the same level of centrifuge retention capacity. Accordingly, it may be used in hygiene products such as diapers and sanitary napkins, absorbent pads for food, pee pads for pets, and the like.

The polymer film laminate may be prepared by laminating the above-described non-woven fabric and the polymer film. For example, the preparation method of the polymer film laminate of the present disclosure may include the steps of: laminating a lower polymer film; laminating a central non-woven fabric; and laminating an upper polymer film. The "central non-woven fabric" is the same as the non-woven fabric described above.

In the step of laminating the non-woven fabric and the polymer film, there is no particular limitation in a method for fixing the material to be laminated. For example, an adhesive commonly used in the art may be used, but an adhesive material for fixing may not be used.

Figure 6:
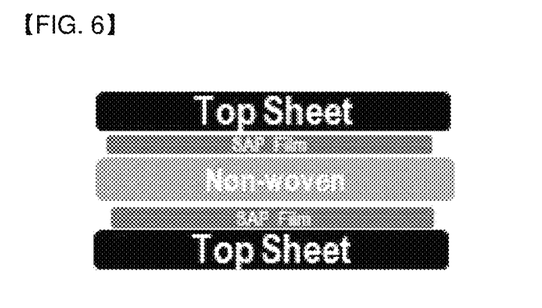
FIG. 6 is a polymer film of the present disclosure including a non-woven fabric and a polymer film above and below the non-woven fabric, and a cross-sectional view of a polymer film laminate of Examples 2-1 to 2-6. The laminate of FIG. 6 was laminated in the order of a top sheet, a lower polymer film (SAP Film), a central non-woven fabric, an upper polymer film (SAP Film), and a top sheet from the bottom.

Meanwhile, a step of laminating an additional non-woven fabric may be further included before the laminating step of the lower polymer film and after the laminating step of the upper polymer film. The additional non-woven fabric functions as a top sheet to prevent the upper and lower polymer films from being exposed to the outside. A structure of the polymer film laminate including the additional non-woven fabric may be understood with reference to FIG. 6. The top sheet of FIG. 6 is the additional non-woven fabric, SAP Film is the polymer film, and non-woven is the central non-woven fabric. The additional non-woven fabric is not particularly limited as long as it is a material commonly used in the art.

Hereinafter, it will be described in more detail to help the understanding of the present invention. However, the following examples only illustrate the present invention, and the content of the present invention is not limited by the following examples.

Example 1-1: Preparation of Polymer Film

A neutralized solution in which 70 mol % of acrylic acid was neutralized was prepared by mixing 55 g of acrylic acid, 66.6 g of a 45 wt % potassium hydroxide (KOH) solution, and 55 g of water.

An internal cross-linking agent (polyethylene glycol diacrylate (PEGDA), MW=400, manufactured by Aldrich), hydroxyethyl cellulose (HEC, Natrosol 250HR from Ashland), glycerin, sodium persulfate as a thermal polymerization initiator, and Irgacure 819 as a photopolymerization initiator were added to the neutralized solution to prepare a monomer composition having a solid content (TSC) of 54 wt %.

At this time, PEGDA was added in an amount of 0.5 parts by weight based on 100 parts by weight of the solid content in the monomer composition, HEC was added in an amount of 0.45 parts by weight based on 100 parts by weight of the solid content in the monomer composition, and glycerin was added in an amount of 40 parts by weight based on 100 parts by weight of acrylic acid. In addition, the thermal polymerization initiator and the photopolymerization initiator were added in an amount of 1000 ppm and 80 ppm based on the total weight of the monomer composition, respectively.

A viscosity of the prepared monomer composition at 25° C. was measured using Brookfield DV2T LV TJ0 under the conditions of 1 rpm and spindle #1, and the viscosity of the monomer composition was confirmed to be 735 mPa·s.

Subsequently, the monomer composition was coated on one side of a polyethylene terephthalate (PET) film to form a 0.2 mm thick monomer composition film (moisture content of 30%). A comma coater (Gap 700 μm) was used for coating, and an applicator roll moved at 0.3 m/min.

Then, polymerization was performed by irradiating UV light of 370 mJ/cm$^2$ to the monomer composition film to form a hydrogel polymer film. The thickness of the prepared hydrogel polymer film was 0.2 mm, and it was confirmed that there was no significant change compared to the monomer composition and the moisture content was 30 wt %. Then, the prepared hydrogel polymer was dried at a temperature of 90° C. for 10 minutes to prepare a dried polymer film having a moisture content of 10 wt % and a thickness of 0.2 mm.

Thereafter, a hole structure pattern (a pattern in which one side of a simple cubic structure is repeated, wherein a diameter of the circular hole is 3 mm and a distance between the holes is 3 mm) was formed on the dried polymer film using CAMEO Cutting Printer from Silhouette in a Print & Cut method, thereby forming a polymer film (SAP film) having a moisture content of 10 wt % and a thickness of 0.2 mm.

Example 1-2: Preparation of Polymer Film

A polymer film was prepared in the same manner as in Example 1-1, except that the diameter of the circular hole of the pattern was 4 mm and the distance between the holes was 4 mm in the step of forming a pattern on the dried polymer film.

Example 1-3: Preparation of Polymer Film

A polymer film was prepared in the same manner as in Example 1-1, except that the diameter of the circular hole of the pattern was 4 mm and the distance between the holes was 8 mm in the step of forming a pattern on the dried polymer film.

Example 1-4: Preparation of Polymer Film

A polymer film was prepared in the same manner as in Example 1-1, except that the diameter of the circular hole of the pattern was 5 mm and the distance between the holes was 5 mm in the step of forming a pattern on the dried polymer film.

Example 1-5: Preparation of Polymer Film

A polymer film was prepared in the same manner as in Example 1-1, except that the diameter of the circular hole of the pattern was 6 mm and the distance between the holes was 6 mm in the step of forming a pattern on the dried polymer film.

Example 1-6: Preparation of Polymer Film

A polymer film was prepared in the same manner as in Example 1-1, except that the pattern was a pattern in which one side of the face-centered cubic structure was repeated in the step of forming a pattern on the dried polymer film.

Example 1-7: Preparation of Polymer Film

A polymer film was prepared in the same manner as in Example 1-1, except that the pattern was a pattern in which one side of the face-centered cubic structure was repeated, wherein the diameter of the circular hole of the pattern was 4 mm and the distance between the holes was 4 mm in the step of forming a pattern on the dried polymer film.

Example 1-8: Preparation of Polymer Film

A polymer film was prepared in the same manner as in Example 1-1, except that the pattern was a pattern in which one side of the face-centered cubic structure was repeated, wherein the diameter of the circular hole of the pattern was 4 mm and the distance between the holes was 8 mm in the step of forming a pattern on the dried polymer film.

Example 1-9: Preparation of Polymer Film

Figure 5:
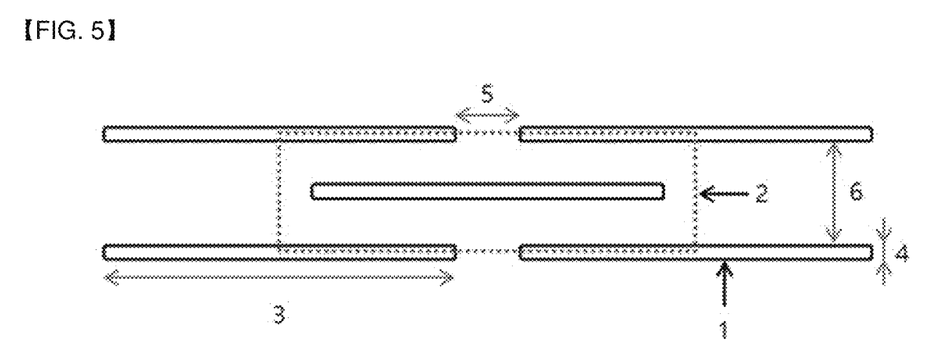

A polymer film was prepared in the same manner as in Example 1-1, except that the pattern was a pattern in which a rectangular hole structure was repeated, wherein one hole had the width of 6.06 mm and the length of 0.25 mm, and the distance between the holes was 1.12 mm in width and 1.72 mm in length in the step of forming a pattern on the dried polymer film. Specific specifications of the pattern of Example 1-9 may be understood with reference to FIG. 5.

Example 1-10: Preparation of Polymer Film

A polymer film was prepared in the same manner as in Example 1-1, except that the thickness of the film was 0.1 mm.

Reference Example 1-1: Preparation of Polymer Film

A polymer film was prepared in the same manner as in Example 1-1, except that the step of forming a pattern was omitted.

Experimental Example 1: Measurement of Physical Properties of Polymer Film

The weight, weight per unit area, elongation, absorption rate, and centrifuge retention capacity of Examples 1-1 to 1-10 and Reference Example 1-1 were measured by the following method and are shown in Table 1 below.

(1) Weight (g) and weight per unit area (g/m$^2$)

The prepared polymer film (thickness: 0.2 mm or 0.1 mm) was cut to a size of 10 cm*25 cm (width*length) to make a specimen, and then its weight was measured with a scale.

Thereafter, the weight per unit area was calculated by dividing the measured weight by 0.025 m$^2$ (=10 cm*25 cm).

(2) Elongation (%)

A specimen was prepared by cutting the polymer film or sheet into a rectangular shape with a size of 20 mm×60 mm to have smooth cut surface. Then, an initial gauge distance of a tensile strength measuring device (TAXTplus, manufactured by Stable Micro Systems) was set to 20 mm, and then the specimen was mounted. The specimen was pulled at a rate of 0.5 mm per minute to measure a gauge distance at fracture, and the elongation was obtained by dividing the value by the initial gauge distance.

$$\text{Elongation } (\%)=(L_1-L_0)/L_0*100 \qquad \text{[Equation 1]}$$

in the Equation 1, $L_0$ is an initial gauge length, and $L_1$ is a gauge length at fracture.

(3) Absorption Rate (Sec)

A specimen was prepared by cutting the prepared polymer film to a size of 10 cm*25 cm (width*length) to have smooth cut surface, and a non-woven fabric with the same size was attached above and below the polymer film. Then, a cylindrical plastic tube with an inner diameter of 60 mm was placed in the center of the polymer film, and 80 ml of 0.9 wt % saline was added at a rate of 15 ml/s using a funnel, followed by measuring the time taken until all the saline was absorbed.

(4) Centrifuge Retention Capacity (CRC, g/g)

The centrifuge retention capacity (CRC) was measured according to the EDANA WSP 241.2. The moisture content of the polymer film of each Example and Reference Example to be measured is 10 wt % as described above, and the centrifuge retention capacity was measured without adjusting the moisture content.

Specifically, the polymer film was cut to have a weight (W0) of 0.08 to 0.12 g, put in a non-woven envelope, and sealed. Then, it was immersed in 0.9 wt % sodium chloride aqueous solution (physiological saline) at room temperature. After 30 minutes, the envelope was centrifuged at 250G for 3 minutes to drain, and the weight W2 (g) of the envelope was measured. Further, after carrying out the same operation without using the polymer film, the weight W1 (g) of the envelope was measured. Then, CRC (g/g) was calculated by using the obtained weight values according to the following Equation 2.

$$\text{CRC } (g/g)=\{[W2(g)-W1(g)]/W0(g)\}-1 \qquad \text{Equation 2.}$$

TABLE 1

|  | Hole shape/ arrangement | Hole diameter (mm) | Distance between holes (mm) | Weight (g) | Weight per unit area (g/m$^2$) | Absorption rate (s) | CRC (g/g) | Elongation (%) |
| --- | --- | --- | --- | --- | --- | --- | --- | --- |
| Example 1-1 | Circular/ simple cubic | 3 | 3 | 4.36 | 174.4 | 35 | 35.1 | 277 |
| Example 1-2 | Circular/ simple cubic | 4 | 4 | 4.35 | 174 | 35 | 35.1 | 301 |
| Example 1-3 | Circular/ simple cubic | 4 | 8 | 4.98 | 199.2 | 31 | 35.1 | 240 |
| Example 1-4 | Circular/ simple cubic | 5 | 5 | 4.51 | 180.4 | 34 | 35.1 | 258 |
| Example 1-5 | Circular/ simple cubic | 6 | 6 | 4.36 | 174.4 | 30 | 35.1 | 295 |
| Example 1-6 | Circular/ face- centered cubic | 3 | 3 | 3.32 | 132.8 | 39 | 35.1 | 270 |
| Example 1-7 | Circular/ face- centered cubic | 4 | 4 | 3.35 | 134 | 37 | 35.1 | 222 |
| Example 1-8 | Circular/ face- centered cubic | 4 | 8 | 4.58 | 183.2 | 34 | 35.1 | 263 |
| Example 1-9 | rectangular/ face- centered cubic | width 6.06 length 0.25 | width 1.12 length 1.72 | 4.99 | 199.6 | 43 | 35.1 | 195 |
| Example 1-10 | Circular/ simple cubic | 3 | 3 | 2.09 | 83.6 | 24 | 35.2 | 131 |
| Reference Example 1-1* | — | — | — | 5.3 | 212 | 92 | 35.1 | 235 |

*Reference Example 1-1 does not include a pattern, so the pattern structure, hole diameter, and distance between holes are not described.

As shown in Table 1, it was confirmed that the polymer films of Preparation Examples including the hole structure pattern had superior absorption performance such as absorption rate compared to Reference Example including no hole structure pattern, and had the same level of centrifuge retention capacity and elongation while having a small weight per unit area.

Example 2-1: Preparation of Polymer Film Laminate

The polymer film including the hole structure prepared in Example 1-1 was cut into 2 sheets with a size of 10 cm*25 cm. As a TOP sheet, DEMAO's Cellulose non-woven fabric with a thickness of 0.25 T was cut into 2 sheets with a size of 10 cm*25 cm. As a non-woven fabric located in the center, a Cotton non-woven fabric having a thickness of 0.22 T and 40 gsm (manufactured by Namyang Nonwoven Fabric) was cut to a size of 10 cm*25 cm.

Thereafter, the cut film and non-woven fabric were laminated in the order of a top sheet, a lower polymer film, a central non-woven fabric, an upper polymer film, and a top sheet to prepare a super absorbent polymer film laminate. The structure of the polymer film laminate may be understood with reference to FIG. 6.

Example 2-2: Preparation of Polymer Film Laminate

A polymer film laminate was prepared in the same manner as in Example 2-1, except that the upper polymer film was the polymer film prepared in Example 1-10. The structure of the polymer film laminate may be understood with reference to FIG. 6.

Example 2-3: Preparation of Polymer Film Laminate

A polymer film laminate was prepared in the same manner as in Example 2-1, except that the lower polymer film was the polymer film prepared in Example 1-10. The structure of the polymer film laminate may be understood with reference to FIG. 6.

Example 2-4: Preparation of Polymer Film Laminate

A polymer film laminate was prepared in the same manner as in Example 2-1, except that a Cotton non-woven fabric having a thickness of 0.22 T and 50 gsm (manufactured by Namyang Nonwoven Fabric) was used as the non-woven fabric located in the center. The structure of the polymer film laminate may be understood with reference to FIG. 6.

Example 2-5: Preparation of Polymer Film Laminate

A polymer film laminate was prepared in the same manner as in Example 2-1, except that a Cotton non-woven fabric having a thickness of 0.22 T and 50 gsm (manufactured by Namyang Nonwoven Fabric) was used as the non-woven fabric located in the center, and the polymer film prepared in Example 1-10 was used as the upper polymer film. The structure of the polymer film laminate may be understood with reference to FIG. 6.

Example 2-6: Preparation of Polymer Film Laminate

A polymer film laminate was prepared in the same manner as in Example 2-1, except that a Cotton non-woven fabric having a thickness of 0.22 T and 50 gsm (manufactured by Namyang Nonwoven Fabric) was used as the non-woven fabric located in the center, and the polymer film prepared in Example 1-10 was used as the lower polymer film. The structure of the polymer film laminate may be understood with reference to FIG. 6.

Comparative Example 1: Preparation of Laminate Including Only Polymer Film

The polymer film not including the hole structure prepared in Reference Example 1-1 was cut to a size of 10 cm*25 cm. As a TOP sheet, DEMAO's Cellulose non-woven fabric was cut into 2 sheets with a size of 10 cm*25 cm. Thereafter, the cut film and the non-woven fabric were laminated in the order of a top sheet, a polymer film, and a top sheet to prepare a polymer film laminate.

Comparative Example 2: Preparation of Laminate Including Only Polymer Film

A polymer film laminate was prepared in the same manner as in Comparative Example 1, except that the polymer film prepared in Example 1-1 was used as the polymer film.

Comparative Example 3: Preparation of Laminate Including Polymer Film Having No Hole Structure Pattern A polymer film laminate was prepared in the same manner as in Example 2-1, except that a Cotton non-woven fabric having a thickness of 0.22 T and 50 gsm (manufactured by Namyang Nonwoven Fabric) was used as the non-woven fabric located in the center, and the polymer film prepared in Reference Example 1-1 was used as the upper and lower polymer films. The structure of the polymer film laminate may be understood with reference to FIG. 6.

Experimental Example 2: Measurement of Physical Properties of Polymer Film Laminate The centrifuge retention capacity and absorption rate of the laminates prepared in Examples 2-1 to 2-6 and Comparative Examples 1 to 3 were measured by the following method, and are shown in Tables 2 and 3 below.

(1) Centrifuge Retention Capacity (g/g)

The centrifuge retention capacity (CRC) was measured according to the EDANA WSP 241.2. The moisture content of the polymer film of each Example and Comparative Example to be measured is 10 wt % as described above, and the centrifuge retention capacity was measured without adjusting the moisture content.

Specifically, the polymer film laminate was cut to have a weight (W0) of 0.08 to 0.12 g, put in a non-woven envelope, and sealed. Then, it was immersed in 0.9 wt % sodium chloride aqueous solution (physiological saline) at room temperature. After 30 minutes, the envelope was centrifuged at 250G for 3 minutes to drain, and the weight W2 (g) of the envelope was measured. Further, after carrying out the same operation without using the polymer, the weight W1 (g) of the envelope was measured. Then, CRC (g/g) was calculated by using the obtained weight values according to the following Equation 2.

$$CRC\ (g/g) = \{[W2(g) - W1(g)]/W0(g)\} - 1 \qquad \text{Equation 2.}$$

(2) Absorption Rate (Sec)

A specimen was prepared by cutting the prepared polymer film laminate to a size of 10 cm*25 cm (width*length) to have smooth cut surface. Then, a cylindrical plastic tube with an inner diameter of 60 mm was placed in the center of the polymer film laminate, and 80 ml of 0.9 wt % saline was added at a rate of 15 ml/s using a funnel, followed by measuring the time taken until all the saline was absorbed.

TABLE 2

| Laminate structure | Example 2-1 | Example 2-2 | Example 2-3 | Example 2-4 | Example 2-5 | Example 2-6 |
|---|---|---|---|---|---|---|
| | (from the bottom) Top sheet/lower polymer film/central nonwoven fabric/ upper polymer film/Top sheet | | | | | |
| Hole diameter (mm) | 3 | 3 | 3 | 3 | 3 | 3 |
| Distance between holes (mm) | 3 | 3 | 3 | 3 | 3 | 3 |
| Material of non-woven fabric | Cotton | Cotton | Cotton | Cotton | Cotton | Cotton |
| Density of non-woven fabric (g/m$^2$) | 40 | 40 | 40 | 50 | 50 | 50 |
| Thickness of upper film (mm) | 0.2 | 0.1 | 0.2 | 0.2 | 0.1 | 0.2 |
| Thickness of lower film (mm) | 0.2 | 0.2 | 0.1 | 0.2 | 0.2 | 0.1 |

TABLE 2-continued

| Laminate structure | Example 2-1 | Example 2-2 | Example 2-3 (from the bottom) Top sheet/lower polymer film/central nonwoven fabric/ upper polymer film/Top sheet | Example 2-4 | Example 2-5 | Example 2-6 |
|---|---|---|---|---|---|---|
| CRC (g/g) | 32 | 32 | 32 | 32 | 32 | 32 |
| Absorption rate (s) | 23 | 23 | 22 | 27 | 25 | 25 |

TABLE 3

| Laminate structure | Comparative Example 1 (from the bottom) Top sheet/polymer film/ Top sheet | Comparative Example 2 | Comparative Example 3 (from the bottom) Top sheet/lower polymer film/central nonwoven fabric/upper polymer film/Top sheet |
|---|---|---|---|
| Hole diameter (mm) | — | 3 | — |
| Distance between holes (mm) | — | 3 | — |
| Material of non-woven fabric | — | — | Cotton |
| Density of non-woven fabric (g/m$^2$) | — | — | 50 |
| Thickness of upper film (mm) | — | — | 0.2 |
| Thickness of lower film (mm) | — | — | 0.2 |
| CRC (g/g) | 32 | 32 | 32 |
| Absorption rate (s) | 91 | 36 | 90 |

As shown in Tables 2 and 3, it was confirmed that the polymer film laminate including the polymer film above and below the central non-woven fabric had the same level of centrifuge retention capacity and superior absorption rate compared to the polymer film laminate not including the non-woven fabric. In addition, it was confirmed that even if the polymer film is included above and below the central non-woven fabric, when a polymer film having no hole structure pattern is used as in Comparative Example 3, the absorption rate was significantly inferior.

The invention claimed is:

1. A polymer film comprising
a polymer obtained by polymerizing an acrylic acid-based monomer having at least partially neutralized acidic groups,
wherein a thickness of the film is 0.001 mm or more and 0.5 mm or less,
the polymer film comprises a pattern having a hole structure penetrating the film, and
an elongation calculated by the following Equation 1 is 100% or more:

$$\text{Elongation }(\%)=(L_1-L_0)/L_0*100 \quad [\text{Equation 1}]$$

in the Equation 1,
$L_0$ is an initial gauge length, and
$L_1$ is a gauge length at fracture when the specimen is pulled at a rate of 0.5 mm per minute, wherein the acrylic acid-based monomer is a compound represented by the following Chemical Formula 1:

$$R^1\text{—COOM}^1 \quad [\text{Chemical Formula 1}]$$

in Chemical Formula 1,
$R^1$ is a C2 to C5 alkyl group having an unsaturated bond, and
$M^1$ is a hydrogen atom, a monovalent or divalent metal, or an ammonium group.

2. The polymer film of claim 1,
wherein a maximum diameter of each hole structure is 1 mm or more and 15 mm or less.

3. The polymer film of claim 1,
wherein a distance between holes of the pattern is 1 mm or more and 10 mm or less.

4. The polymer film of claim 1,
wherein a total area of the hole structure is 15% or more and 80% or less of an area of the film.

5. The polymer film of claim 1,
wherein a weight per unit area is 100 g/m$^2$ or more and 210 g/m$^2$ or less when the thickness of the film is 0.2 mm.

6. The polymer film of claim 1,
wherein a centrifuge retention capacity (CRC) of the film is 30 g/g or more,
wherein an absorption rate of the film is 10 seconds or more and 50 seconds or less, and
the absorption rate is a time taken until all of a 0.9 wt % saline is absorbed when the polymer film is cut to a size of 10 cm in width*25 cm in length to have smooth cut surface, a non-woven fabric with the same size is attached above and below the polymer film, a cylindrical plastic tube with an inner diameter of 60 mm is placed in a center of the polymer film, and then 80 ml of the saline is added at a rate of 15 ml/s using a funnel.

7. The polymer film of claim 1,
wherein an absorption rate of the film is 10 seconds or more and 50 seconds or less, and the elongation is 100% or more and 550% or less.

8. A product comprising the polymer film of claim 1,
wherein the product is any one of hygiene products, wallpaper with moisture absorption and desorption property, absorbent pads for food, pee pads for pets and medical bands.

9. A preparation method of the polymer film of claim 1, comprising:
preparing a monomer composition by mixing an acrylic acid-based monomer having at least partially neutralized acidic groups, a cellulose-based thickener, a moisturizing agent, a polymerization initiator, and a solvent;
forming a monomer composition film by casting the monomer composition on a substrate;
forming a hydrogel polymer film by irradiating heat or light while drawing the monomer composition film;
drying the hydrogel polymer film to form a dried polymer film; and forming a polymer film by forming a pattern on the dried polymer film.

10. The preparation method of the polymer film of claim 9, wherein the cellulose-based thickener is at least one selected from the group consisting of nanocellulose, hydroxyethylcellulose, hydroxypropylcellulose, hydroxyethylmethylcellulose, and hydroxypropylmethylcellulose.

11. The preparation method of the polymer film of claim 9, wherein the moisturizing agent is at least one selected from the group consisting of glycerin; diglycerin; propylene glycol; butylene glycol; sorbitol; polyethylene glycol; polyglycerin-3; polyglycerin-6; polyglycerin-10; and polyglyceryl-10 distearate and a derivative thereof (C3 to C18); citric acid; triethylcitrate, methylcitrate, sodium citrate, and trisodium 2-methylcitrate.

12. The preparation method of the polymer film of claim 9, wherein the cellulose-based thickener is contained in an amount of 0.01 to 5 parts by weight based on 100 parts by weight of a solid content in the monomer composition.

13. The preparation method of the polymer film of claim 9, wherein the moisturizing agent is contained in an amount of 5 to 70 parts by weight based on 100 parts by weight of the acrylic acid-based monomer.

14. The preparation method of the polymer film of claim 9, wherein a viscosity at 25° C. of the monomer composition is 100 mPa·s or more.

15. The preparation method of the polymer film of claim 9, wherein the forming the polymer film is performed in a Print and Cut method.

16. A polymer film laminate comprising:
a non-woven fabric; and
the polymer film of claim 1 being both above and below the nonwoven fabric.

17. The polymer film laminate of claim 16, wherein a weight per unit area of the non-woven fabric having a thickness of 0.25 mm is 60 g/m$^2$ or less.

18. The polymer film laminate of claim 16, wherein a maximum diameter of the hole structure is 1 mm or more and 15 mm or less, wherein a distance between holes of the pattern is 1 mm or more and 10 mm or less, and wherein a total area of the hole structure is 20% or more and 80% or less of an area of the polymer film.

19. The polymer film laminate of claim 16, wherein a weight per unit area of the polymer film having a thickness of 0.2 mm is 100 g/m$^2$ or more and 210 g/m$^2$ or less.

20. The polymer film laminate of claim 16, wherein centrifuge retention capacity (CRC) is 30 g/g or more, wherein an absorption rate is 10 seconds or more and 30 seconds or less, and the absorption rate is a time taken until all of 0.9 wt % saline is absorbed when the polymer film laminate is cut to a size of 10 cm in width*25 cm in length to have smooth cut surface, a cylindrical plastic tube with an inner diameter of 60 mm is placed in a center of the polymer film laminate, and then 80 ml of the saline is added at a rate of 15 ml/s using a funnel.

* * * * *